US012729290B2

(12) United States Patent
Noda

(10) Patent No.: US 12,729,290 B2
(45) Date of Patent: Sep. 8, 2026

(54) STEEL CORD COATING RUBBER COMPOSITION AND PNEUMATIC TIRE

(71) Applicant: Toyo Tire Corporation, Itami (JP)

(72) Inventor: Asuka Noda, Itami (JP)

(73) Assignee: Toyo Tire Corporation, Itami (JP)

( * ) Notice: Subject to any disclaimer, the term of this patent is extended or adjusted under 35 U.S.C. 154(b) by 572 days.

(21) Appl. No.: 18/214,709

(22) Filed: Jun. 27, 2023

(65) Prior Publication Data

US 2024/0141147 A1 May 2, 2024

(30) Foreign Application Priority Data

Oct. 27, 2022 (JP) ................................ 2022-172261

(51) Int. Cl.

*C08L 9/00* (2006.01)
*B60C 1/00* (2006.01)
*C08K 5/43* (2006.01)
*C09D 7/63* (2018.01)
*C09D 109/00* (2006.01)

(52) U.S. Cl.

CPC ................. *C08L 9/00* (2013.01); *B60C 1/00* (2013.01); *C08K 5/43* (2013.01); *C09D 7/63* (2018.01); *C09D 109/00* (2013.01); *C08L 2203/206* (2013.01)

(58) Field of Classification Search

CPC ........ C08L 9/00; C08L 2203/206; B60C 1/00; C08K 5/43; C08K 5/04; C09D 7/63; C09D 109/00

See application file for complete search history.

(56) References Cited

U.S. PATENT DOCUMENTS

2022/0098386 A1* 3/2022 Nagai ................. C08K 5/3415

FOREIGN PATENT DOCUMENTS

JP 2002-013084 A 1/2002
JP 2004-083766 A 3/2004

OTHER PUBLICATIONS

Office Action dated Apr. 21, 2026, issued in counterpart JP Application No. 2022-172261, with English translation.(6 pages).

* cited by examiner

*Primary Examiner* — Alicia Bland
(74) *Attorney, Agent, or Firm* — WHDA, LLP

(57) ABSTRACT

An object is to provide a steel cord coating rubber composition that provides excellent workability and excellent peel resistance under heat aging conditions. The steel cord coating rubber composition includes, per 100 parts by mass of a diene-based rubber, 1 to 5 parts by mass of sodium hexamethylene-1,6-bisthiosulfate dihydrate and 0.1 to 1 part by mass of 1,3,5-triazine-2,4,6-trithiol, and the content ratio between sodium hexamethylene-1,6-bisthiosulfate dihydrate and 1,3,5-triazine-2,4,6-trithiol (sodium hexamethylene-1,6-bisthiosulfate dihydrate/1,3,5-triazine-2,4,6-trithiol) on a mass basis is 1.6 or more.

6 Claims, No Drawings

STEEL CORD COATING RUBBER COMPOSITION AND PNEUMATIC TIRE

BACKGROUND OF THE INVENTION

1. Field of the Invention

The present invention relates to a steel cord coating rubber composition and also to a pneumatic tire.

2. Description of Related Art

In pneumatic tires, especially radial tires, steel cords are often used as a reinforcing material for the belt layer of a passenger car tire, the belt, carcass, or chafer layer of a large tire for trucks and buses, etc. As tires are used for a longer period of time, there has been an emphasis on enhancing the reinforcing effect of steel cords to maintain durability over the long term, and a rubber composition for coating steel cords is required to have excellent adhesion to steel cords.

For the improvement of adhesion, as described in JP2004-83766A and JP2002-13084A, triazinetrithiol mono-alkali metal salts have been used in the past. However, there has been a risk that use of triazinethiol or a di- or tri-alkali metal salt of triazinetrithiol may lead to increased chemical hygroscopicity (deliquescence), resulting in the deterioration of adhesion.

In addition, for the improvement of workability, organic acid cobalt salts have sometimes been used in the past. However, from the viewpoint of environmental protection, it is desirable not to use an organic acid cobalt salt, and there is a demand for a rubber composition that is excellent in workability even without incorporating an organic acid cobalt salt.

SUMMARY OF THE INVENTION

In view of the above points, an object of some aspects of the invention is to provide a steel cord coating rubber provides excellent workability and composition, which excellent peel resistance under heat aging conditions, and also a pneumatic tire.

Incidentally, JP2004-83766A and JP2002-13084A nowhere describe examples in which sodium hexamethylene-1,6-bisthiosulfate dihydrate and 1,3,5-triazine-2,4,6-trithiol are used together.

The invention encompasses the following embodiments.

[1] A steel cord coating rubber composition including, per 100 parts by mass of a diene-based rubber, 1 to 5 parts by mass of sodium hexamethylene-1,6-bisthiosulfate dihydrate and 0.1 to 1 part by mass of 1,3,5-triazine-2,4,6-trithiol, in which the content ratio between sodium hexamethylene-1,6-bisthiosulfate dihydrate and 1,3,5-triazine-2,4,6-trithiol (sodium hexamethylene-1,6-bisthiosulfate dihydrate/1,3,5-triazine-2,4,6-trithiol) on a mass basis is 1.6 or more.

[2] The steel cord coating rubber composition according to [1], in which the diene-based rubber includes a natural rubber (NR) and/or an isoprene rubber (IR).

[3] The steel cord coating rubber composition according to [1] or [2], being free of an organic acid cobalt.

[4] A pneumatic tire made using the steel cord coating rubber composition according to any of [1] to [3].

According to a steel cord coating rubber composition of an aspect of the invention, excellent workability and excellent peel resistance under heat aging conditions can be obtained.

DESCRIPTION OF EMBODIMENTS

Hereinafter, matters relevant to the practice of the invention will be described in detail.

A steel cord coating rubber composition according to this embodiment includes, per 100 parts by mass of a diene-based rubber, 1 to 5 parts by mass of sodium hexamethylene-1,6-bisthiosulfate dihydrate and 0.1 to 1 part by mass of 1,3,5-triazine-2,4,6-trithiol, and the content ratio between sodium hexamethylene-1,6-bisthiosulfate dihydrate and 1,3,5-triazine-2,4,6-trithiol (sodium hexamethylene-1,6-bisthiosulfate dihydrate/1,3,5-triazine-2,4,6-trithiol) on a mass basis is 1.6 or more.

As the diene-based rubber used as a rubber component in the rubber composition according to this embodiment, for example, natural rubbers (NR), isoprene rubbers (IR), butadiene rubbers (BR), styrene butadiene rubbers (SBR), styrene-isoprene copolymer rubbers, butadiene-isoprene copolymer rubbers, styrene-isoprene-butadiene copolymer rubbers, acrylonitrile butadiene rubbers (NBR), chloroprene rubbers (CR), butyl rubbers (IIR), and the like can be mentioned. It is possible to use one kind of diene-based rubber alone or a blend of two or more kinds.

It is preferable that the rubber component includes a natural rubber and/or an isoprene rubber, and the natural rubber and isoprene rubber content in 100 parts by mass of the diene-based rubber is preferably 80 parts by mass or more, more preferably 90 parts by mass or more, and still more preferably 95 parts by mass or more.

The rubber composition according to this embodiment contains sodium hexamethylene-1,6-bisthiosulfate dihydrate, and the content thereof is, per 100 parts by mass of the diene-based rubber, 1 to 5 parts by mass, preferably 1 to 3 parts by mass, and more preferably 1 to 2 parts by mass. When the content is within the above ranges, excellent workability and excellent peel resistance under heat aging conditions can be easily obtained.

The rubber composition according to this embodiment contains 1,3,5-triazine-2,4,6-trithiol, and the content thereof is, per 100 parts by mass of the diene-based rubber, 0.1 to 1 part by mass, preferably 0.1 to 0.8 parts by mass, and more preferably 0.1 to 0.5 parts by mass. 1,3,5-Triazine-2,4,6-trithiol has a highly reactive thiol group and thus is highly effective when the content is 0.1 parts by mass or more, and excellent workability and peel resistance under heat aging conditions can be easily obtained, while when the content is 1 part by mass or less, the shortening of the scorch time and the occurrence of rubber scorching can be easily suppressed.

The content ratio between sodium hexamethylene-1,6-bisthiosulfate dihydrate and 1,3,5-triazine-2,4,6-trithiol (sodium hexamethylene-1,6-bisthiosulfate dihydrate/1,3,5-triazine-2,4,6-trithiol) on a mass basis is 1.6 or more, preferably 1.6 to 50, more preferably 2 to 30, and still more preferably 3 to 15. When the content ratio is within the above ranges, excellent workability and excellent peel resistance under heat aging conditions can be easily obtained.

As a result of combined use of sodium hexamethylene-1,6-bisthiosulfate dihydrate and 1,3,5-triazine-2,4,6-trithiol in a predetermined ratio, the steel cord coating rubber composition according to this embodiment provides excellent workability and excellent peel resistance under heat aging conditions. This mechanism is not clear, but can be surmised as follows. First, sodium hexamethylene-1,6-bisthiosulfate dihydrate is cleaved, and the radicals thus generated react with the metal surface of steel cords and double bonds in the polymer, forming a crosslinked structure. Then, because the crosslinked structure formed by sodium hexamethylene-1,6-bisthiosulfate dihydrate is thermally more stable compared to a crosslinked structure formed by sulfur, it can be surmised that peel resistance under heat aging conditions improves. Here, similarly to sodium hexamethylene-1,6-bisthiosulfate dihydrate, 1,3,5-triazine-2,4,6-trithiol used together also generates radicals upon cleavage. However, 1,3,5-triazine-2,4,6-trithiol has three highly reactive thiol groups in the structure, and thus is thought to be more likely to generate radicals compared to sodium hexamethylene-1,6-bisthiosulfate dihydrate. Then, radicals generated from 1,3,5-triazine-2,4,6-trithiol accelerate the generation of radicals from sodium hexamethylene-1,6-bisthiosulfate dihydrate, accelerating the reaction with the metal surface of steel cords and double bonds in the polymer. That is, it can be surmised that combined use of sodium hexamethylene-1,6-bisthiosulfate dihydrate and 1,3,5-triazine-2,4,6-trithiol in a predetermined ratio provides a synergistic effect on improving peel resistance. Further, it can be surmised that as a result of limiting the content of highly reactive 1,3,5-triazine-2,4,6-trithiol to a small amount, the scorch time has been extended, resulting in an unexpected effect, that is, the improvement of workability.

The rubber composition according to this embodiment can incorporate a reinforcing filler.

As the reinforcing filler, carbon black and/or silica is preferably used. That is, the reinforcing filler may be carbon black alone, silica alone, or a combination of carbon black and silica. Carbon black or a combination of carbon black and silica is preferable. The reinforcing filler content is not particularly limited and is, for example, per 100 parts by mass of the diene-based rubber, preferably 10 to 140 parts by mass, more preferably 20 to 100 parts by mass, and still more preferably 30 to 80 parts by mass.

The carbon black is not particularly limited, and various known species can be used. The carbon black content is, per 100 parts by mass of the diene-based rubber, preferably 5 to 100 parts by mass, and more preferably 20 to 80 parts by mass.

Silica is not particularly limited either, but it is preferable to use wet silica, such as wet-precipitated silica or wet-gelled silica. When silica is incorporated, the content thereof is, per 100 parts by mass of the diene-based rubber, preferably 5 to 40 parts by mass, and more preferably 5 to 30 parts by mass.

The rubber composition according to this embodiment can incorporate a methylene acceptor and a methylene donor. As a result of a reaction between the hydroxyl group of the methylene acceptor and the methylene group of the methylene donor, the adhesion between the rubber and steel cords can be enhanced, and the deterioration of adhesion due to the load or heat generation during the running of the tire can be suppressed.

As the methylene acceptor, a phenol compound or a phenolic resin obtained by condensing a phenol compound with formaldehyde is used. Such phenol compounds include phenol, resorcinol, and alkyl derivatives thereof. Alkyl derivatives include methyl group derivatives such as cresol and xylenol, as well as derivatives with relatively long-chain alkyl groups, such as nonylphenol and octylphenol. A phenol compound may contain an acyl group such as an acetyl group as a substituent.

In addition, phenolic resins obtained by condensing phenol compounds with formaldehyde include resorcinol-formaldehyde resins, phenol resins (i.e., phenol-formaldehyde resins), cresol resins (i.e., cresol-formaldehyde resins), and the like, as well as formaldehyde resins composed of a plurality of phenol compounds. They are used in the form of uncured resins that are liquid or have thermal fluidity.

Among them, from the standpoint of compatibility with the rubber component and other components, the density of the resin after curing, and its reliability, resorcinol or a resorcinol derivative is preferable as the methylene acceptor, and it is particularly preferable to use resorcinol or a resorcinol-alkylphenol-formalin resin.

The content of such a methylene acceptor is not particularly limited, but is, per 100 parts by mass of the diene-based rubber, preferably 1 to 10 parts by mass, and more preferably 1 to 4 parts by mass.

As the methylene donor, hexamethylenetetramine or a melamine derivative is used. As the melamine derivative, for example, methylolmelamine, a partially etherified product of methylolmelamine, a condensate of melamine, formaldehyde, and methanol, or the like is used. Among them, hexamethoxymethylmelamine is particularly preferable.

The methylene donor content is not particularly limited, but is, per 100 parts by mass of the diene-based rubber, preferably 0.5 to 10 parts by mass, and more preferably 0.5 to 4 parts by mass.

The rubber composition according to this embodiment may incorporate an organic acid cobalt salt as an adhesion improver for adhesion to steel cords as long as the effect of the invention is not impaired. However, from the viewpoint of environmental protection, it is preferable that no organic acid cobalt salt is contained. As organic acid cobalt salts, for example, cobalt naphthenate, cobalt stearate, cobalt oleate, cobalt neodecanoate, cobalt rosinate, cobalt borate, cobalt maleate, and the like can be mentioned.

In the rubber composition according to this embodiment, in addition to the components described above, formulated chemicals used in the usual rubber industry, such as process oils, zinc oxide, stearic acid, softeners, plasticizers, waxes, antioxidants, vulcanizing agents, and vulcanization accelerators, can be suitably incorporated within the usual ranges.

As the vulcanizing agents, sulfur components such as powder sulfur, precipitated sulfur, colloidal sulfur, insoluble sulfur, and highly dispersed sulfur can be mentioned. The content thereof is not particularly limited, but is, per 100 parts by mass of the diene-based rubber, preferably 1 to 10 parts by mass, and more preferably 2 to 8 parts by mass. In addition, the vulcanization accelerator content is, per 100 parts by mass of the diene-based rubber, preferably 0.1 to 3 parts by mass, and more preferably 0.2 to 2 parts by mass.

As vulcanization accelerators, sulfenamide-based vulcanization accelerators, thiuram-based vulcanization accelerators, thiazole-based vulcanization accelerators, thiourea-based vulcanization accelerators, guanidine-based vulcanization accelerators, dithiocarbamate-based vulcanization accelerators, and like vulcanization accelerators may be used alone, or may also be suitably mixed and used. Among them, a sulfenamide-based vulcanization accelerator is preferable, and N-(tert-butyl)-2-benzothiazolesulfenamide (TBBS) is more preferable.

The rubber composition according to this embodiment can be prepared by kneading in the usual manner using a commonly used mixer, such as a Banbury mixer, a kneader, or a roll.

The rubber composition according to this embodiment is used as a coating (topping) rubber for steel cords for use as a reinforcing material in the belt layer or carcass layer of a pneumatic tire. That is, the rubber composition is used as a coating rubber composition for belt cords and/or carcass cords. A steel cord topping sheet is produced from the rubber composition in the usual manner using a topping apparatus such as a steel calender, and an unvulcanized tire is made using this sheet as a belt layer and/or a carcass layer and then vulcanization-molded in the usual manner, whereby a pneumatic tire can be produced.

The pneumatic tire is not particularly limited and may be a tire for passenger cars or a heavy-duty tire. Incidentally, the structure of a pneumatic tire itself is well known and is not particularly limited. A pneumatic tire generally has a pair of left and right beads, a pair of left and right sidewalls, and a tread provided between the left and right sidewalls so as to connect the radially outer ends of the sidewalls, and also has at least one carcass layer extending between the pair of left and right beads. The carcass layer extends through the tread and the sidewalls and is anchored at both ends with the beads, serving to reinforce the above parts. In addition, on the outer peripheral side of the carcass layer in the tread, a belt layer (usually two or more layers) is provided between the carcass layer and the tread rubber, serving to reinforce the tread on the outer periphery of the carcass layer. In this embodiment, in the case where the rubber composition described above is used as a coating rubber for steel cords, the composition may be applied to either of the belt layer and the carcass layer, or may also be applied to both.

EXAMPLES

Hereinafter, examples of the invention will be shown, but the invention is not limited to these examples.

Using a Banbury mixer, following the formulations (parts by mass) shown in Table 1 below, first, in the first mixing stage, components excluding sulfur and vulcanization accelerator were added and mixed (discharge temperature=160° C.). Next, in the final mixing stage, sulfur and a vulcanization accelerator were added to the obtained mixture and mixed (discharge temperature=90° C.), thereby preparing a rubber composition.

The details of each component in Table 1 are as follows.

Natural rubber: RSS #3

Carbon black: HAF, "SEAST 300" manufactured by Tokai Carbon Co., Ltd.

Silica: "Ultrasil VN3" manufactured by Evonik

Zinc oxide: "Type 3 Zinc Oxide" manufactured by Mitsui Mining & Smelting Co., Ltd.

Stearic acid: "Beads Stearic Acid" manufactured by NOF Corporation

Antioxidant: "Nocrac 6C" manufactured by Ouchi Shinko Chemical Industrial Co., Ltd.

Resorcinol derivative: "Sumikanol 620" manufactured by Sumitomo Chemical Co., Ltd., resorcinol-alkylphenol-formalin resin Melamine derivative: "CYREZ 963L" manufactured by Allnex Japan Inc., hexamethoxymethyl melamine Cobalt stearate: "Corebond CS-9.5" manufactured by Taiko Fine Chemicals Co., Ltd.

Crosslinking agent 1: "Duralink HTS" manufactured by Flexsys, sodium hexamethylene-1,6-bisthiosulfate dihydrate Crosslinking agent 2: "Thiocyanuric Acid" manufactured by Tokyo Chemical Industry Co., Ltd., 1,3,5-triazine-2,4,6-trithiol Sulfur: "MUCRON OT-20" manufactured by Shikoku Chemicals Corporation Vulcanization accelerator: "Sanceler NS-G" manufactured by Sanshin Chemical Industry Co., Ltd., N-(tert-butyl)-2-benzothiazolesulfenamide (TBBS)

Each obtained rubber composition was evaluated for workability, scorch, and peel resistance under heat aging conditions. The evaluation methods are as follows.

Workability: In accordance with JIS K6300, using a rotorless Mooney machine manufactured by Toyo Seiki Co., Ltd., an unvulcanized rubber was preheated at 100° C. for 1 minute, and the torque value after 4 minutes was measured in Mooney units. The result was expressed as an index taking the torque value of Comparative Example 1 as 100. The higher the numerical value, the higher the torque value, indicating better workability.

Scorch: In accordance with JIS K6300, using a rotorless Mooney machine manufactured by Toyo Seiki Co., Ltd., an unvulcanized rubber composition was preheated at 125° C. for 1 minute, and the time t5 taken for the viscosity to increase by 5 Mooney units from the minimum viscosity Vm was measured and expressed as an index taking the value of Comparative Example 1 as 100. A higher numerical value indicates a longer Mooney scorch time.

Peel resistance under heat aging conditions: 12 brass-plated steel cords (3×0.20+6×0.35 structure, copper: zinc=64:36%, plating weight=6 g/kg) were arranged in parallel at intervals of 25 mm, and the cords were sandwiched from both sides by 0.8-mm-thick sheets of each rubber composition shown in Table 1, thereby making a cord/rubber composite sheet. Two such sheets were superimposed so that the cord arrangement directions were parallel to each other and press-vulcanized at 150° C.×30 minutes, thereby making an adhesion evaluation sample. The obtained sample was left in an oven at 100° C. for 96 hours, and then the two steel cord layers were subjected to a peel test using an autograph (DCS500 manufactured by Shimadzu Corporation) to determine the peel strength. The result was expressed as an index taking the value of Comparative Example 1 as 100. A larger numerical value indicates better peel strength.

TABLE 1

| | Comp. Ex. 1 | Comp. Ex. 2 | Comp. Ex. 3 | Comp. Ex. 4 | Comp. Ex. 5 | Comp. Ex. 6 | Comp. Ex. 7 | Ex. 1 | Ex. 2 | Ex. 3 | Ex. 4 |
|---|---|---|---|---|---|---|---|---|---|---|---|
| Natural rubber | 100 | 100 | 100 | 100 | 100 | 100 | 100 | 100 | 100 | 100 | 100 |
| Carbon black | 60 | 60 | 60 | 60 | 60 | 60 | 60 | 60 | 60 | 60 | 60 |
| Silica | 10 | 10 | 10 | 10 | 10 | 10 | 10 | 10 | 10 | 10 | 10 |
| Zinc oxide | 8 | 8 | 8 | 8 | 8 | 8 | 8 | 8 | 8 | 8 | 8 |
| Stearic acid | 1 | 1 | 1 | 1 | 1 | 1 | 1 | 1 | 1 | 1 | 1 |
| Antioxidant | 2 | 2 | 2 | 2 | 2 | 2 | 2 | 2 | 2 | 2 | 2 |
| Resorcinol derivative | 2 | 2 | 2 | 2 | 2 | 2 | 2 | 2 | 2 | 2 | 2 |
| Melamine derivative | 2 | 2 | 2 | 2 | 2 | 2 | 2 | 2 | 2 | 2 | 2 |
| Cobalt stearate | — | — | — | — | — | — | 2 | — | — | — | — |
| Crosslinking agent 1 | 2 | 1.5 | 1 | — | 1 | 1.5 | — | 1.5 | 1.5 | 1.5 | 1.5 |
| Crosslinking agent 2 | — | 1 | — | 2 | 1 | 1 | — | 0.5 | 0.3 | 0.2 | 0.1 |

TABLE 1-continued

| | Comp. Ex. 1 | Comp. Ex. 2 | Comp. Ex. 3 | Comp. Ex. 4 | Comp. Ex. 5 | Comp. Ex. 6 | Comp. Ex. 7 | Ex. 1 | Ex. 2 | Ex. 3 | Ex. 4 |
|---|---|---|---|---|---|---|---|---|---|---|---|
| Sulfur | 6 | 6 | 6 | 6 | 6 | 6 | 6 | 6 | 6 | 6 | 6 |
| Vulcanization accelerator | 1 | 1 | 1 | 1 | 1 | 1 | 1 | 1 | 1 | 1 | 1 |
| Crosslinking agent 1/ Crosslinking agent 2 | — | — | — | — | 1 | 1.5 | — | 3 | 5 | 7.5 | 15 |
| Workability | 100 | 100 | 99 | 90 | 102 | 101 | 100 | 103 | 105 | 107 | 110 |
| Scorch | 100 | 96 | 92 | 25 | 35 | 42 | 90 | 80 | 90 | 95 | 95 |
| Peel resistance under heat aging conditions | 100 | 109 | 107 | 103 | 97 | 97 | 108 | 113 | 124 | 127 | 131 |

(Comp. Ex.: Comparative Example, Ex.: Example)

The results are as shown in Table 1. Comparative Examples 1 to 3 are examples where sodium hexamethylene-1,6-bisthiosulfate dihydrate was used alone as a crosslinking agent, and Comparative Example 4 is an example where 1,3,5-triazine-2,4,6-trithiol was used alone as a crosslinking agent. A comparison between Examples 1 to 4 and Comparative Examples 1 to 4 showed that as a result of combined use of sodium hexamethylene-1,6-bisthiosulfate dihydrate and 1,3,5-triazine-2,4,6-trithiol, excellent workability and excellent peel resistance under heat aging conditions were obtained.

Comparative Examples 5 and 6 are examples where sodium hexamethylene-1,6-bisthiosulfate dihydrate and 1,3,5-triazine-2,4,6-trithiol were present outside the predetermined ratio, and the peel resistance under heat aging conditions was inferior.

A comparison among Comparative Examples 4 to 6 showed that the higher the 1,3,5-triazine-2,4,6-trithiol content, the shorter the scorch time and the worse the workability.

Comparative Example 7 is an example where cobalt stearate was used in place of the crosslinking agents 1 and 2. As compared to Comparative Example 1, no workability improving effect was obtained, and the peel resistance under heat aging conditions was also inferior compared to Examples 1 to 4.

In addition, a comparison among Examples 1 to 4 showed that the larger the content ratio between sodium hexamethylene-1,6-bisthiosulfate dihydrate and 1,3,5-triazine-2,4,6-trithiol (sodium hexamethylene-1,6-bisthiosulfate dihydrate/1,3,5-triazine-2,4,6-trithiol), the greater the improving effects on workability and peel resistance under heat aging conditions.

The steel cord coating rubber composition of the invention is useful as a coating rubber for steel cords, which is a reinforcing material for pneumatic tires. A steel cord-rubber composite using this rubber composition can be used as the belt layer of a tire for passenger cars, the belt, carcass, or chafer layer of a large tire for trucks and buses, etc.

What is claimed is:

1. A steel cord coating rubber composition comprising, per 100 parts by mass of a diene-based rubber:

1 to 5 parts by mass of sodium hexamethylene-1,6-bisthiosulfate dihydrate; and 0.1 to 1 part by mass of 1,3,5-triazine-2,4,6-trithiol, wherein a content ratio between sodium hexamethylene-1,6-bisthiosulfate dihydrate and 1,3,5-triazine-2,4,6-trithiol (sodium hexamethylene-1,6-bisthiosulfate dihydrate/1,3,5-triazine-2,4,6-trithiol) on a mass basis is 3 to 15.

2. The steel cord coating rubber composition according to claim 1, wherein the diene-based rubber includes a natural rubber (NR) and/or an isoprene rubber (IR).

3. The steel cord coating rubber composition according to claim 1, being free of an organic acid cobalt.

4. The steel cord coating rubber composition according to claim 2, being free of an organic acid cobalt.

5. A pneumatic tire made using the steel cord coating rubber composition according to claim 1.

6. A pneumatic tire made using the steel cord coating rubber composition according to claim 2.

* * * * *